United States Patent
Olczak

(10) Patent No.: US 7,316,498 B2
(45) Date of Patent: Jan. 8, 2008

(54) FACETED OPTICAL SUBSTRATE AND METHOD OF FABRICATING A FACETED OPTICAL SUBSTRATE AND A BACKLIGHT DISPLAY COMPRISING THE FACETED OPTICAL SUBSTRATE

(75) Inventor: Eugene George Olczak, Glenville, NY (US)

(73) Assignee: General Electric Company, Schenectady, NY (US)

( * ) Notice: Subject to any disclaimer, the term of this patent is extended or adjusted under 35 U.S.C. 154(b) by 235 days.

(21) Appl. No.: 10/747,961

(22) Filed: Dec. 31, 2003

(65) Prior Publication Data

US 2005/0141844 A1   Jun. 30, 2005

(51) Int. Cl.
  *F21V 7/04* (2006.01)
(52) U.S. Cl. .............. 362/607; 362/620; 362/309; 362/339
(58) Field of Classification Search ........ 362/617–620, 362/624–626, 629, 615, 606, 607, 26, 27, 362/300, 307–330, 331–340
See application file for complete search history.

(56) References Cited

U.S. PATENT DOCUMENTS 6,280,063 B1 *  8/2001  Fong et al. ................ 362/330
6,628,460 B1 *  9/2003  Ookawa et al. ............ 359/455
6,874,902 B2 *  4/2005  Yamashita et al. ......... 362/620
2003/0214728 A1  11/2003  Olczak
2004/0109663 A1   6/2004  Olczak

FOREIGN PATENT DOCUMENTS

| WO | WO 99/42861    | 8/1999 |
| WO | WO 02/04858    | 1/2002 |
| WO | WO 2004/053538 | 6/2004 |
| WO | WO 2004/061536 | 7/2004 |

* cited by examiner

*Primary Examiner*—Sandra O'Shea
*Assistant Examiner*—Bao Q. Truong
(74) *Attorney, Agent, or Firm*—Foley & Lardner LLP

(57) ABSTRACT

There is provided an optical substrate. The optical substrate includes at least one prism structure. Each of the at least one prism structures has a first surface characterized by a first surface structure function modulated by a second surface structure function, the first surface structure function having characteristics to provide that each of the at least one prism structures has a cross section with at least one curved side to provide defocusing diffusion to light incident on the substrate. The second surface structure function has characteristics to provide additional diffusion to the light incident on the substrate.

12 Claims, 16 Drawing Sheets

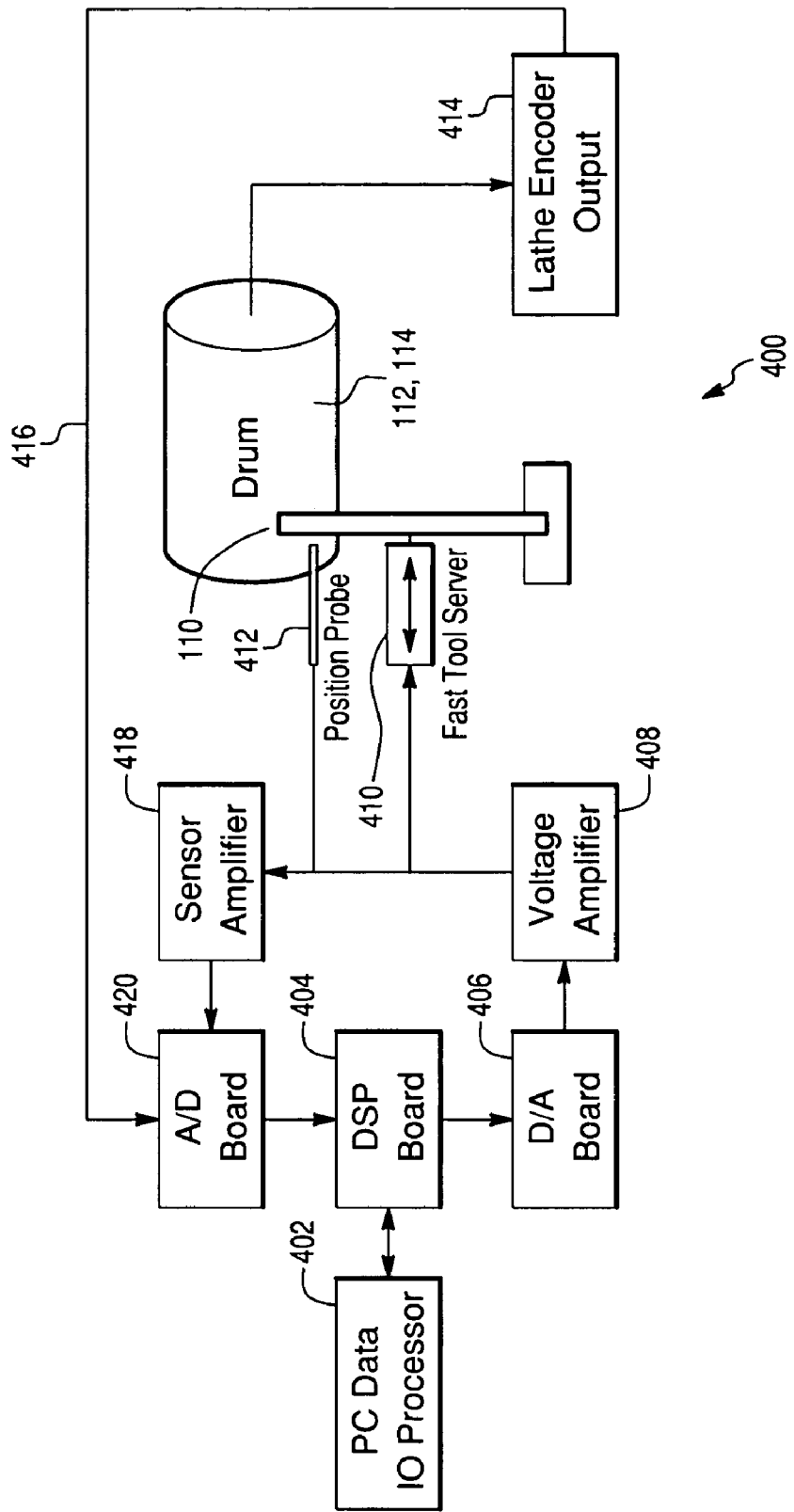

FACETED OPTICAL SUBSTRATE AND METHOD OF FABRICATING A FACETED OPTICAL SUBSTRATE AND A BACKLIGHT DISPLAY COMPRISING THE FACETED OPTICAL SUBSTRATE

BACKGROUND OF THE INVENTION

The invention relates to a faceted optical substrate, a method of fabricating a faceted optical substrate and a backlight display comprising the faceted optical substrate.

Backlight computer displays and other optical systems often use layers of prismatic structures stacked and arranged perpendicular to one another. The structures are typically sandwiched between other optical substrates known as diffusers. For example, in backlight displays, brightness enhancement substrates use prismatic structures to direct light along a viewing axis (i.e., an axis normal to the display, or "on axis"). This enhances brightness of light viewed by the user of the display to allow the system to use less power to create a desired level of on-axis illumination. Substrates for turning light can also be used in a wide range of other optical designs, such as for projection displays, traffic signals, and illuminated signs.

Current commercial brightness enhancement substrates are characterized by a sharp cut-off in brightness between about 40 and 50 degrees off-axis. At angles beyond this cut-off there are side-lobes in the angular brightness distribution. These side-lobes can result in a waste of energy. The side-lobes are also undesirable in security applications since they allow light to reach unintended viewers.

U.S. patent application Ser. No. 10/065,981, incorporated by reference herein in its entirety, discloses a structural shape for the surface of an optical substrate such that the brightness of diffuse light departing from the surface of the optical substrate at certain off axis angles is reduced at the expense of a small reduction in peak brightness measured near the viewing axis. The net result is an overall increase in useful illumination. Such an optical substrate comprises a surface characterized by a cross section of at least one prism having a curved sidewall or facet.

Sometimes, however, these substrates have manufacturing defects. Also, the displays are sometimes deficient in brightness as a result of optical coupling. There is a need to obscure manufacturing defects and to decrease the optical coupling in substrates of these optical devices.

SUMMARY OF THE INVENTION

According to one embodiment of the invention there is provided an optical substrate. The optical substrate comprises: at least one prism structure, each of the at least one prism structures having a first surface characterized by a first surface structure function modulated by a second surface structure function, the first surface structure function having characteristics to provide that each of the at least one prism structures has a cross section with at least one curved side to provide defocusing diffusion to light incident on the substrate, the second surface structure function having characteristics to provide additional diffusion to the light incident on the substrate.

According to one aspect of this embodiment, the at least one curved side is defined by an equation $$z = \frac{cr^2}{1+\sqrt{1-(1+k)c^2r^2}} + dr^2 + er^4 + fr^6,$$

wherein z is a perpendicular deviation of a surface of the curved side from a straight line originating at a first reference point and terminating at a second reference point and coefficients of the equation lie within the following approximate ranges: $-20<c<20$; $-10<d<10$; $-10<e<10$; $-10<f<10$ and $-1<k$ or less than or equal to zero, and where r is the distance along the straight line from the first reference point.

According to another aspect of this embodiment, the at least one curved side is defined by an equation $$z = \frac{cr^2}{1+\sqrt{1-(1+k)c^2r^2}} + \sum_{i=1}^{N} a_i r^i$$

where $a_i$ are coefficients and N is a positive integer greater than 1, z is a perpendicular deviation of a surface of the curved side from a straight line originating at a first reference point and terminating at a second reference point, and where r is the distance along the straight line from the first reference point.

According to another embodiment of the invention there is provided a method of fabricating the optical substrate. The method comprises: bringing a cutting tool into contact with the surface of a workpiece; for at least one cutting pass, causing relative movement between the cutting tool and the surface of the workpiece along a path in the surface of the workpiece; forming a positive or negative electroform over the surface of the workpiece to provide the optical substrate.

According to another embodiment of the invention there is provided a method of fabricating the optical substrate. The method comprises: bringing a cutting tool into contact with the surface of a workpiece; for at least one cutting pass, causing relative movement between the cutting tool and the surface of the workpiece along a path in the surface of the workpiece; forming a positive or negative electroform over the surface of the workpiece; and forming a replica of the electroform to provide the optical substrate.

According to another embodiment of the invention there is provided a work piece for producing an optical substrate. The workpiece comprises at least one prism structure, each of the at least one prism structures having a first surface characterized by a first surface structure function modulated by a second surface structure function, the first surface function having characteristics to provide that each of the at least one prism structure has a cross section with at least one curved side to provide defocusing diffusion to light incident on the substrate, the second surface structure function having characteristics to provide additional diffusion to the light incident on the substrate.

According to another embodiment of the invention there is provided a backlight display device. The device comprises: an optical source for generating light; a light guide for guiding the light there along including a reflective device positioned along the light guide for reflecting the light out of the light guide; and the optical substrate above, wherein optical substrate is receptive of the light from the reflective device.

BRIEF DESCRIPTION OF THE DRAWING

FIG. 23 is a schematic diagram of a master machining system with a fast tool servo for cutting grooves having lateral variations in the surface of a workpiece;

DETAILED DESCRIPTION OF THE INVENTION

Features of the invention will become apparent from the drawings and following detailed discussion, which by way of example without limitation describe preferred embodiments of the invention.

According to copending patent application Ser. No. 10/065,981, filed Dec. 6, 2002, curved cross sectional facets can be used to modify an LCD display luminance distribution by reducing the brightness of off axis angle diffuse light. The present invention provides additional diffusion to these devices.

According to one embodiment of the invention, both diffusion due to defocusing caused by curved cross sectional facets as well as diffusion due to providing modulation to the facet surface, such as by "bowing" the facets so that the path of the facet has a bowed shape, is beneficially provided in the same structure on a substrate. The curved sidewalls of the facets act as defocusing micro lenses. The defocusing diffusion is provided by introducing curved cross sectional facets on the optical substrate. The modulation diffusion is introduced by modulating the surface of the facets on the substrate, such as by modulating the surface with a surface function such as a random or pseudo random function.

Figure 20:
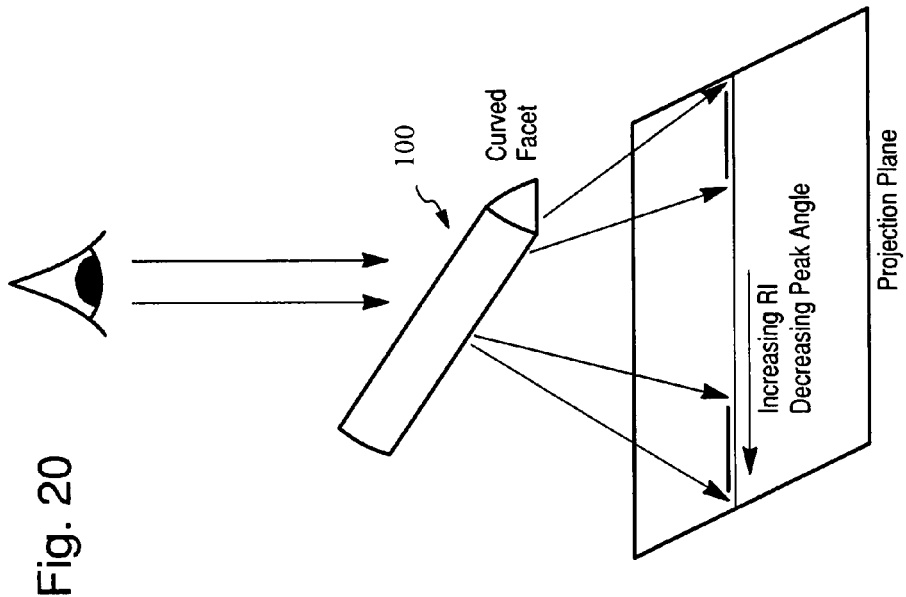
FIG. 20 is a diagram illustrating a prism structure with a facet having a curved cross section.
Figure 19:
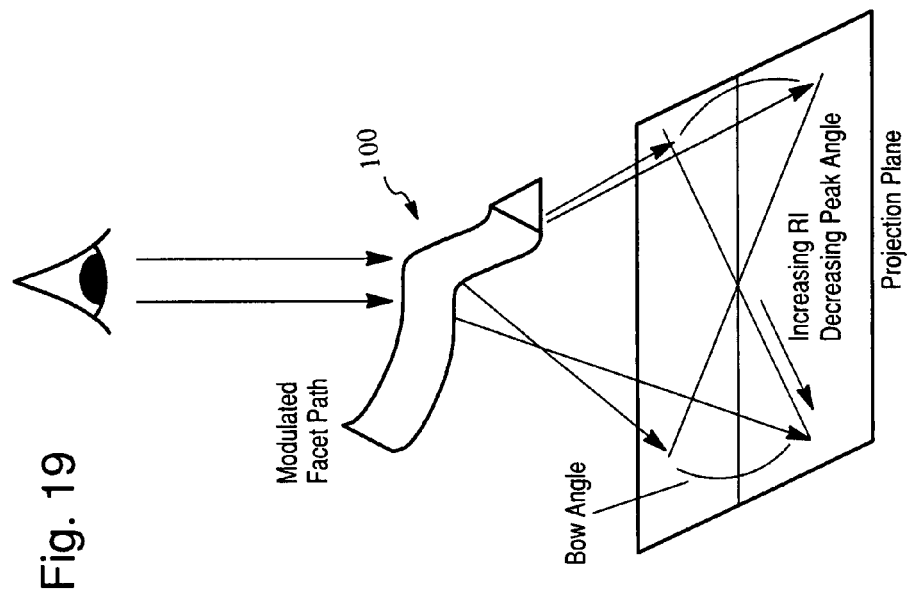
FIG. 19 is a diagram illustrating a prism structure with a facet having a "bowed" path.
Figure 21:
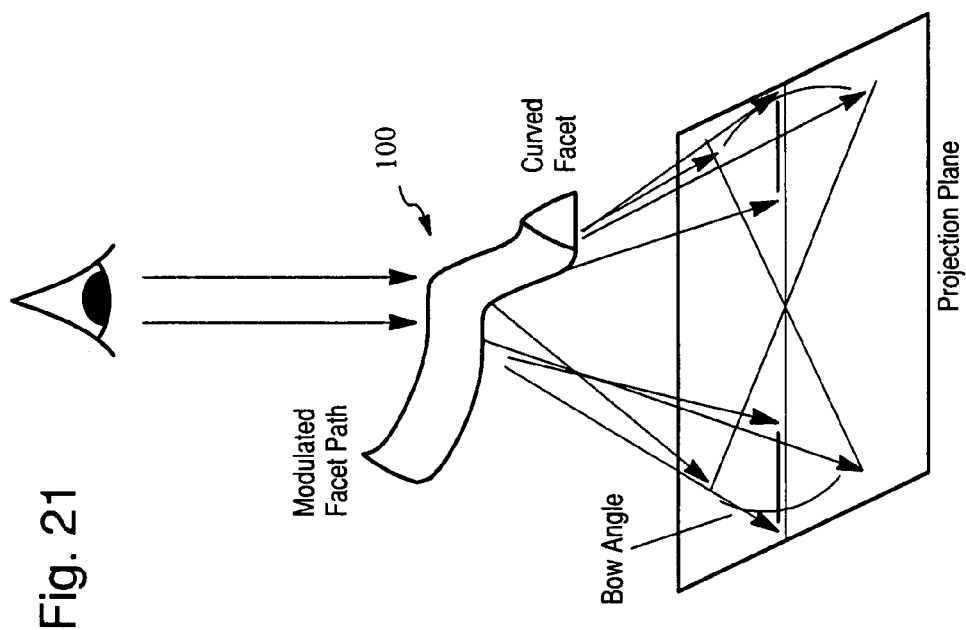
FIG. 21 is a diagram illustrating a prism structure with a facet having a "bowed" path and a curved cross section.

FIGS. 19 and 20 respectively illustrate a facet 100 with a "bowed" shape and a facet 100 of a prism structure which has a curved cross section. FIG. 21 illustrates a facet 100 of a prism structure with both a "bowed" shape and a curved cross section. In all of FIGS. 19-21 the facet is part of a prism structure 102.

The inventors have realized that the diffusion due to modulating the surface and the diffusion due to the curved facet cross section can be adjusted independently because these two types of diffusion are orthogonal. Thus embodiments of the present invention allow for flexibility in designing substrates where a single optical substrate can be formed incorporating both diffusion due to modulation and the diffusion due to the curved facet cross section. This diffusion can be designed into the substrate as desired.

Figure 1:
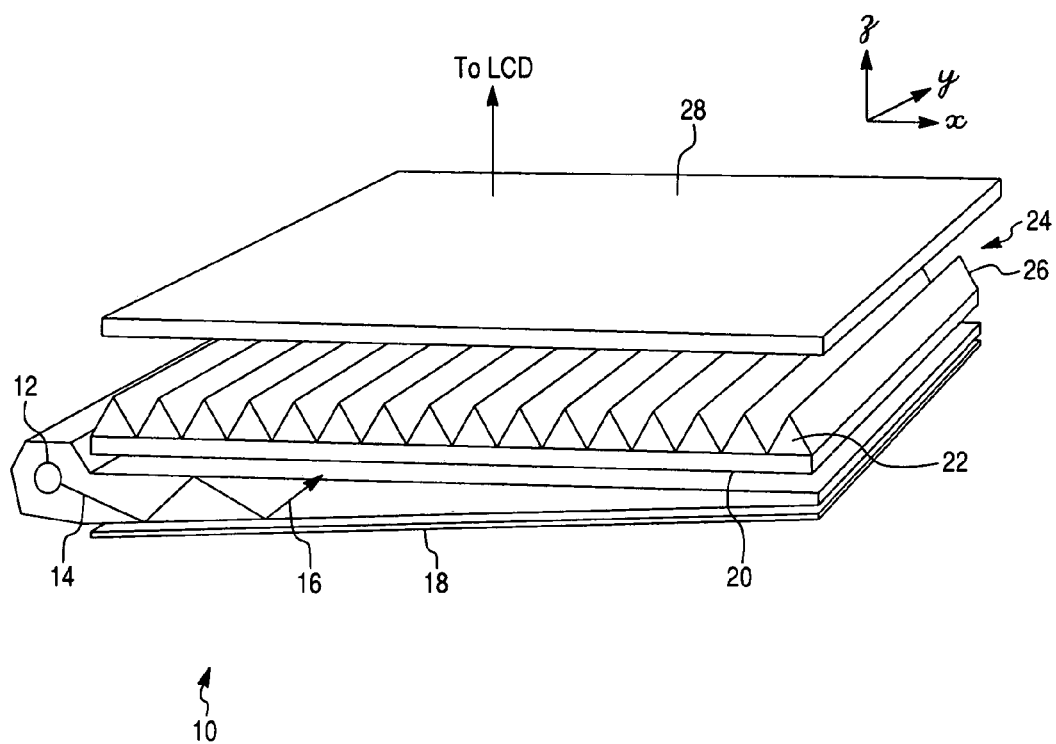
FIG. 1 is a three dimensional view of a backlight display device.

FIG. 1 is a perspective view of a backlight display device 10. The backlight display device 10 comprises an optical source 12 for generating light 16. A light guide 14 guides light 16 along its body from the optical source 12. The light guide 14 contains disruptive features that permit the light 16 to escape the light guide 14. Such disruptive features may include a surface manufactured from a master having a machined cutting gradient. A reflective substrate 18 positioned along the lower surface of the light guide 24 reflects light 16 escaping from a lower surface of the light guide 14 back through the light guide 14 and toward an optical substrate 24. The optical substrate 24 may be fabricated from a positive or negative master and has a surface 22.

At least one optical substrate 24 is receptive of the light 16 from the light guide 14. The optical substrate 24 comprises a planar surface 20 on one side and the surface 22 on the second opposing side. Optical substrate 24 receives light 16 and turns and diffuses the light 16 in a direction that is substantially normal to the optical substrate 24 as shown. A diffuser 28 is located above the optical substrate 14 to provide diffusion of the light 16. For example, the diffuser 28 can be a retarder film that rotates the plane of polarization of light exiting the optical substrate 24 to match the light to the input polarization axis of the LCD. The retarder film may be formed by stretching a textured or untextured polymer substrate along an axis in the plane of the substrate 24.

FIG. 1 shows a single substrate 24. However, a backlight display device may comprises a plurality of substrates 24 positioned, one above the other, in a crossed configuration with respective prismatic structures 26 positioned at angles to one another. Yet further, one or both sides of the substrate 24 may comprise prismatic structures 26. The optical substrate 24 can be formed by a process of electroforming from a work piece master that is fabricated as herein described below.

Figure 2:
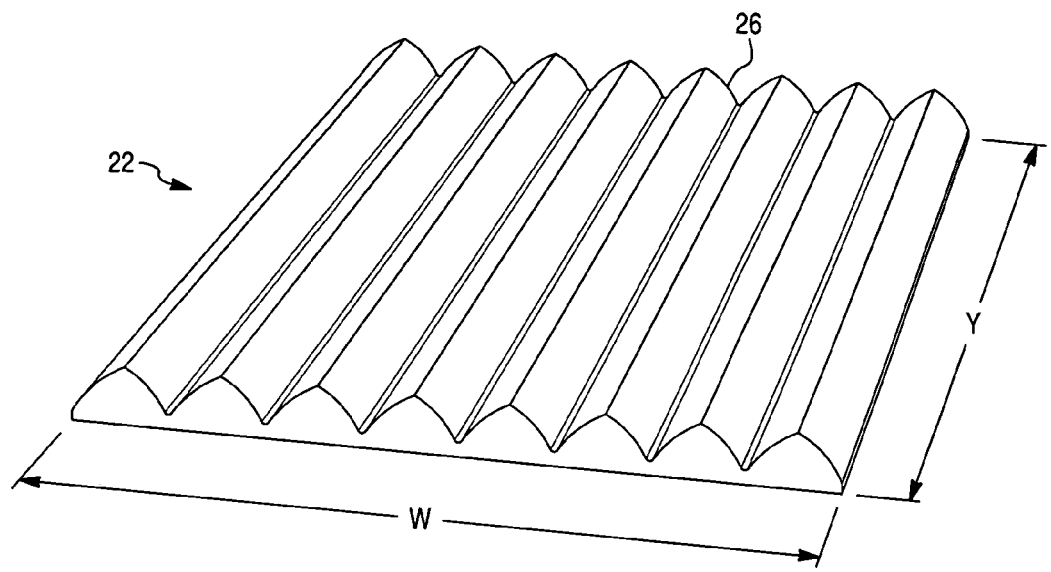
FIG. 2 is a perspective view of an optical substrate comprising a surface characterized by a cross section of prism structures having a curved sidewall or facet.
Figure 3:
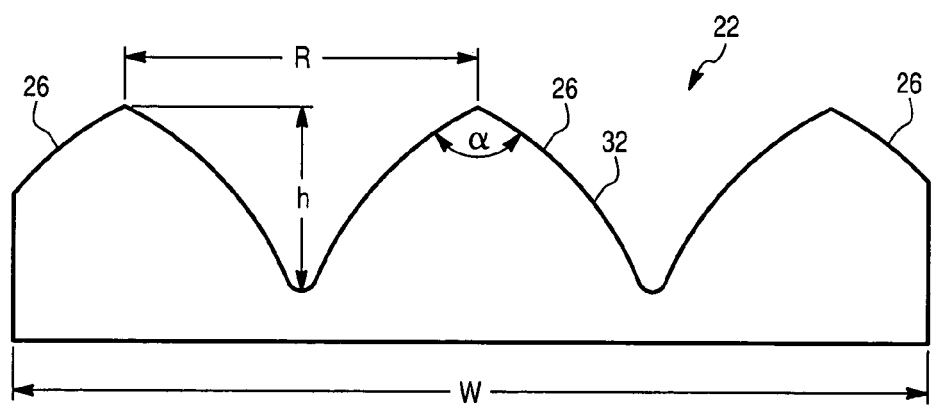
FIG. 3 is a first cross sectional view of an optical substrate comprising a surface characterized by a cross section of prism structures having a curved sidewall or facet.
Figure 4:
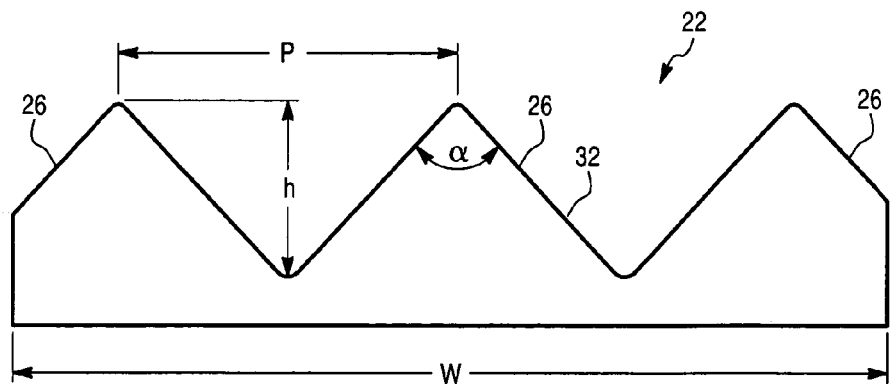
FIG. 4 is a second cross sectional view of an optical substrate comprising a surface characterized by a cross section of prism structures having a curved sidewall or facet.
Figure 7:
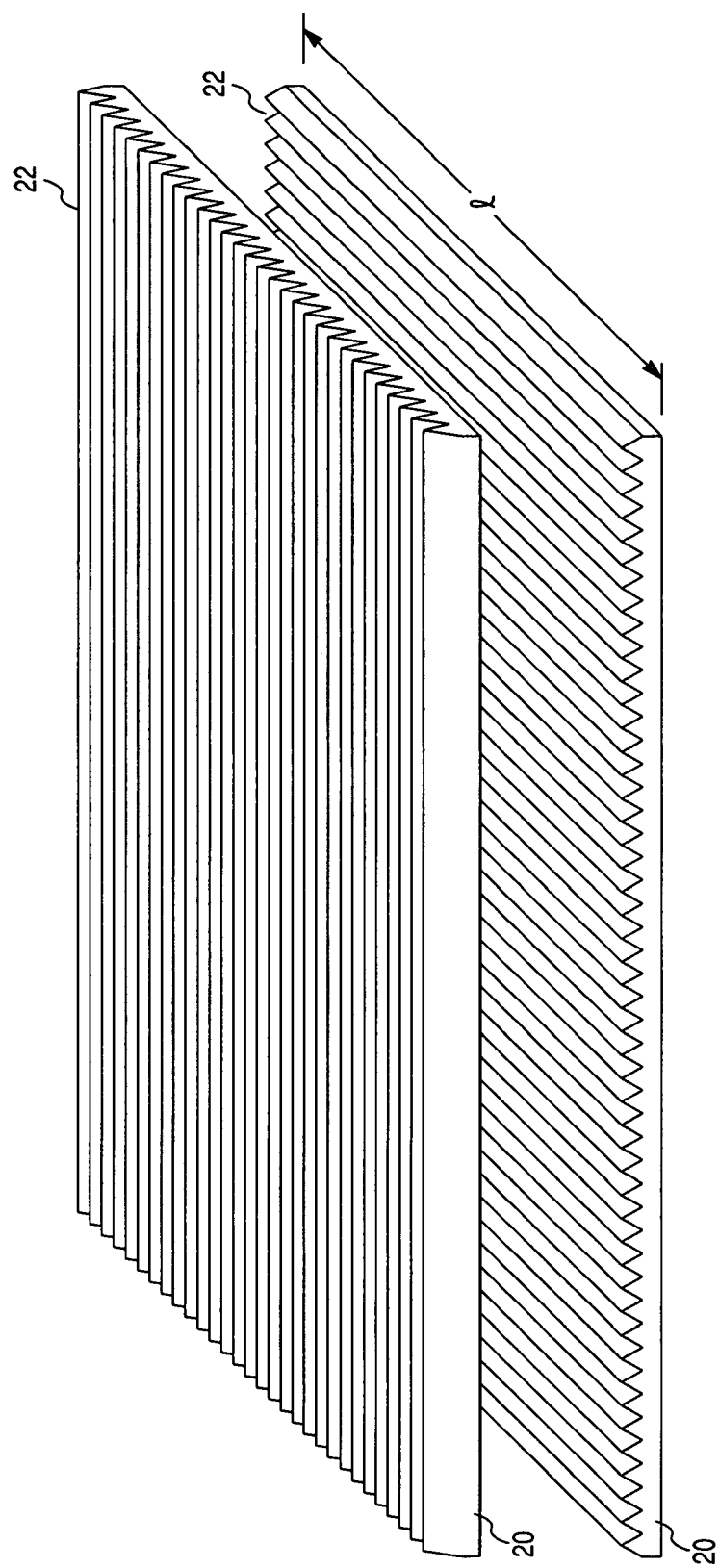
FIG. 7 is a perspective view of two optical substrates positioned in a crossed configuration wherein prismatic structures are positioned at an angle with respect to one another (e.g., 90 degrees).

In FIG. 1, optical substrate 24 comprises a surface 22 defined by prismatic structures 26 (and see FIGS. 2, 3 and 4). The optical substrate 24 can comprise a plurality of substrates positioned, one above the other, in a crossed configuration wherein the prisms 26 are positioned at an angle with respect to one another (e.g., 90 degrees) as seen in FIG. 7. The prisms 26 may have a prescribed peak angle, α, a height, h, a length, l, and a pitch, p and the prismatic surfaces may be randomized in their peak angle, α, height, h, length, l, and pitch, p. Yet further, one or both sides of the substrates 24 may have prisms 26. In FIGS. 2, 3 and 4, in a first embodiment of the invention, the sidewall or facets 32 of the prisms 26 are curved. Thus, the optical substrate 24 includes at least one prism structure 26, where the prism structure has a first surface structure function $f_1(x,y)$ having characteristics to provide that prism structure 26 has a cross section with at least one curved side. Here $f_1(x,y)$ is described in terms of the rectilinear coordinates x and y in the plane of the substrate, and $f_1(x,y)$ is the height above the plane. Of course the first surface structure function may alternatively be described by coordinates other than rectilinear coordinates, such as in polar coordinates, for example.

The at least one curved side provides defocusing diffusion to light incident on the substrate 24. In one embodiment first surface function $f_1(x,y)$ is such that prisms have a curvature that can be described as a segment of a parabola, or more generally as a polynomial surface given by the sag equation:

$$z = \frac{cr^2}{1+\sqrt{1-(1+k)c^2r^2}} + dr^2 + er^4 + fr^6 + \text{Higher order terms in } r \quad (1)$$

where z is the perpendicular deviation (or "sag") in microns of the sidewall or facet 32 of the prisms 26 from a straight reference line 40, originating at a first reference point (b) at a base of the prism and terminating at a second reference point (a) near the peak of the prism (see FIG. 6B), and $c^{-1}$ is the radius of curvature of the facet. The distance along reference line 40 is given by r. Here the coefficients of the polynomial may have the following approximate ranges: $-20<c<20$, $-10<d<10$, $-10<e<10$, $-10<f<10$, and $-1<k$ or less than or equal to zero. It is noted that $c^2r^2$ is greater than or equal to zero and less than or equal to 1. Odd order terms in r (e.g., $r^1$, $r^3$, $r^5$, $r^7$, etc.) with appropriately chosen coefficients may also be used as in Eq. 1. The higher order terms for the even and odd order terms have appropriately chosen coefficients. Terms other than the first $r^2$ term may be written as:

$$z = \frac{cr^2}{1+\sqrt{1-(1+k)c^2r^2}} + \sum_{i=1}^{N} a_i r^i$$

Figure 6A:
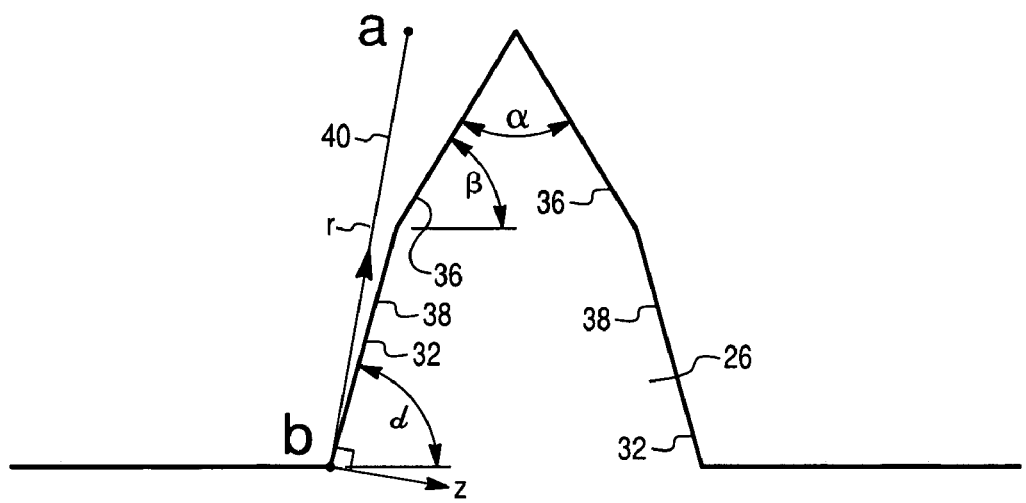
FIG. 6A is a cross section view of a compound angle prism structure and geometric parameters of the curved sidewall or facet of FIGS. 3 and 4 as described by a segment of a polynomial function.
Figure 6B:
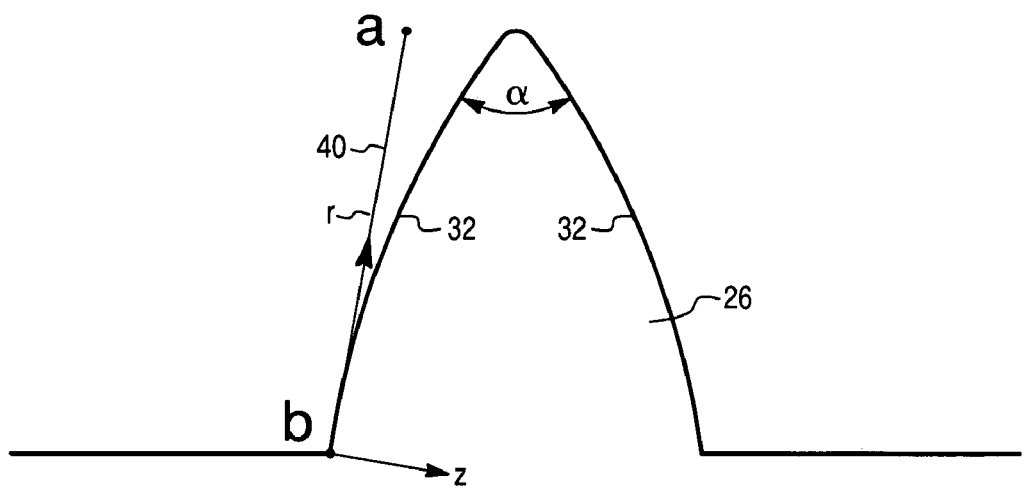
FIG. 6B is a cross section view of a prism structure with curved sidewalls.

In an alternative embodiment, linear segments 36, 38 or other approximations to the polynomial described by Eq. 1 may also be used as seen in FIG. 6A. Linear segments 36, 38 result in a compound angle prism having a first portion at an angle of θ and a second portion at an angle of β. As best understood from FIG. 6A, the curvature of the sidewall or facet 32 of the prisms 26 can be either convex or concave. In FIG. 6A, side facets of the prism are positioned so as to form one or more compound facets 32 with the line segments 36, 38, respectively subtending an angle of β or θ with the base of the prism.

Figure 5:
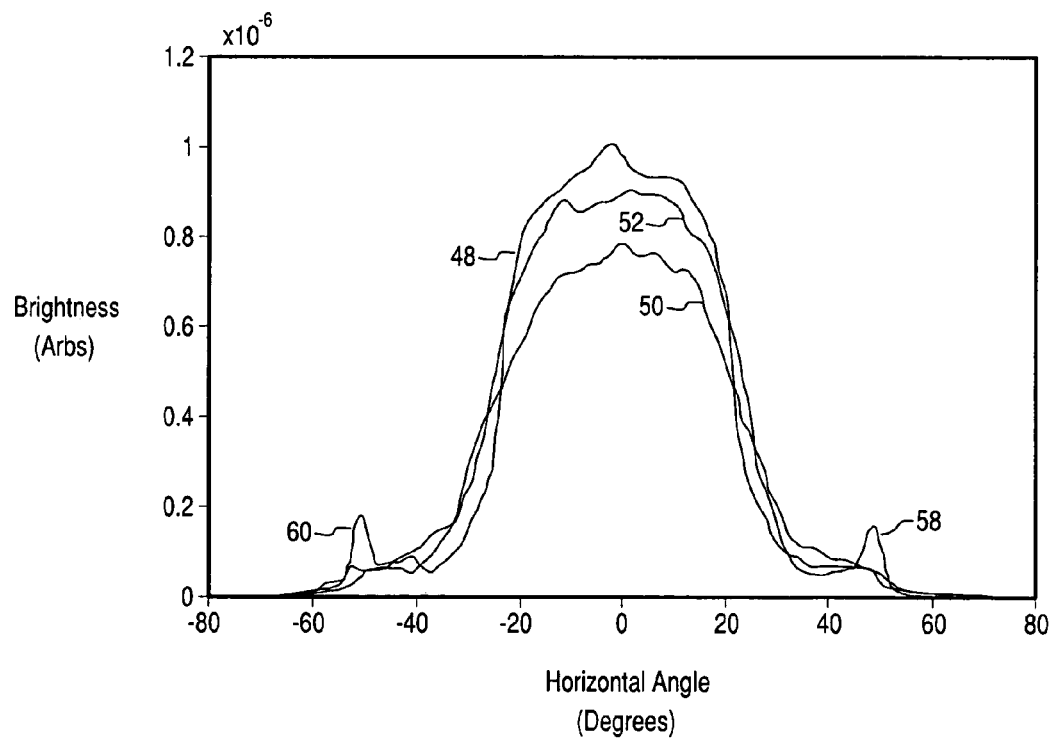
FIG. 5 is a graphical depiction of brightness as a function of horizontal viewing angle for an optical substrate comprising a surface characterized first by a cross section of a right angle prism, second by the curved sidewall or facet in FIG. 3 and third by the curved sidewall or facet in FIG. 4.

Sample cross sections of the prisms 26, over a width w, are shown in FIGS. 2, 3 and 4. FIG. 5 is a graphical depiction of brightness as a function of horizontal viewing angle for an optical substrate comprising a surface characterized first 48 by a cross section of a right angled, straight-sided prism, second 50 by the curved sidewall or facet in FIG. 3, and third 52 by the curved sidewall or facet in FIG. 4. As can be seen in FIG. 5, for a right angled, straight-sided prism 48, the brightness shows significant side lobes 58, 60 at a horizontal view angle of approximately +/−50 degrees. These sidelobes 58, 60 are not seen in either of the curved faceted prisms of FIGS. 3 and 4. However, there is a slight reduction in overall brightness for the curved prisms. As seen by comparing line 52 with line 50 in FIG. 5, for a refractive index of approximately 1.6 in the optical substrate the steeper the curvature of the side wall the greater the reduction in overall brightness. Also, as seen in FIG. 5, as the curvature of the facets increases away from the straight wall of a 90° prism, the wider is the central lobe and the lower is the central luminance and the sidelobes.

In a second embodiment, a relatively high index of refraction for the optical substrate 24 in combination with modified prism geometry yields an enhanced brightness. In particular, FIG. 8 displays a map of the central luminance in percent of crossed optical substrates as a function of the prism peak angle and the refractive index of the substrate, wherein a refractive index of 1.6 and a peak angle of 90 degrees is taken to be 100 percent. By increasing the peak angle to 100 degrees and increasing the refractive index of the optical substrate generally to greater than about 1.65 and in particular to between approximately 1.7 and 1.8, the luminance is at least 102 percent.

Figure 9:
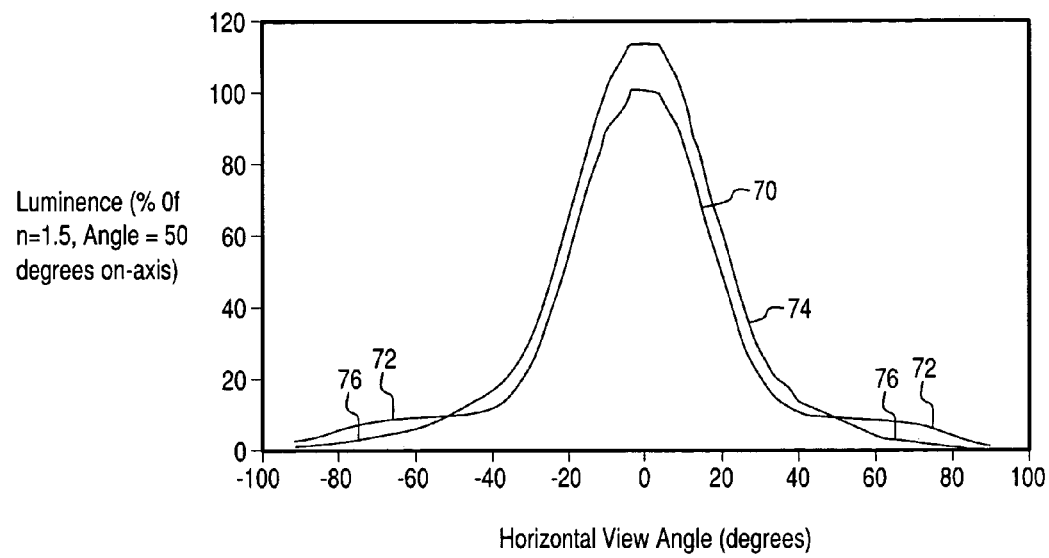
FIG. 9 is a graphical depiction of the far field horizontal luminance of crossed optical substrates as a function of horizontal viewing angle.

FIG. 9 is a graphical depiction of the far field horizontal luminance of crossed optical substrates as a function of horizontal viewing angle. In FIG. 9, a prior art luminance profile, based upon a refractive index of 1.65 and a peak prism angle of 90 degrees is shown at 70. As can be seen in FIG. 9, the prior art shows sidelobes at 72. By increasing the refractive index of the substrates to about 1.75 and the peak prism angle to about 100 degrees, as seen at 74, the central portion of the luminance profile (e.g. +/−30 degrees) displays a higher peak luminance (about 118) with essentially no sidelobes 76.

Figure 10:
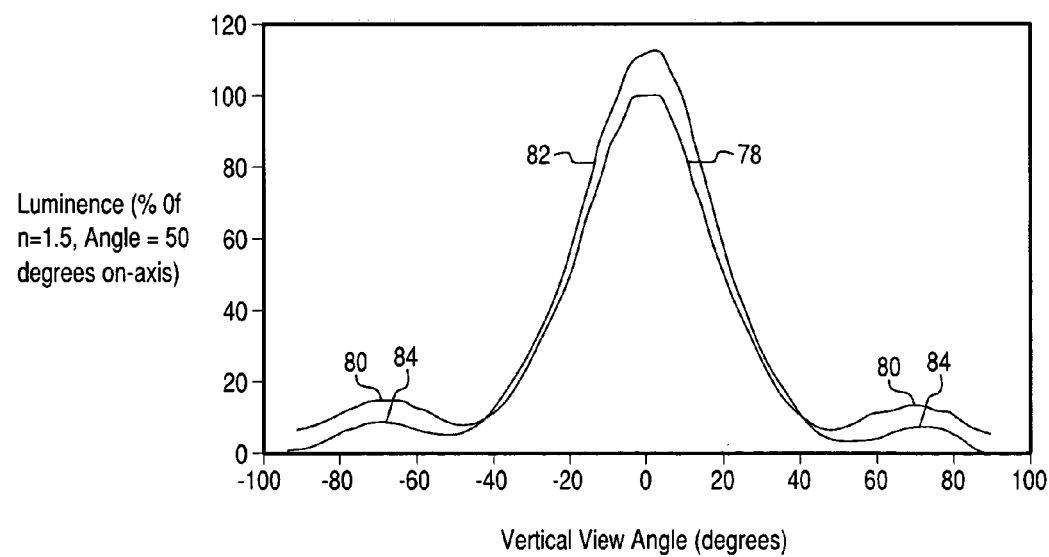
FIG. 10 is a graphical depiction of the far field vertical luminance of crossed optical substrates as a function of vertical viewing angle.

Similarly, FIG. 10 is a graphical depiction of the far field vertical luminance of crossed optical substrates as a function of vertical viewing angle. In FIG. 10, a prior art luminance profile, based upon a refractive index of 1.65 and a peak prism angle of 90 degrees is shown at 78. As can be seen in FIG. 10, the prior art shows sidelobes at 80. By increasing the refractive index of the substrates to about 1.75 and the peak prism angle to about 100 degrees, as seen at 82, the central portion of the luminance profile (e.g. +/−30 degrees) displays a higher peak luminance (about 118) with suppressed sidelobes 84.

Figure 8:
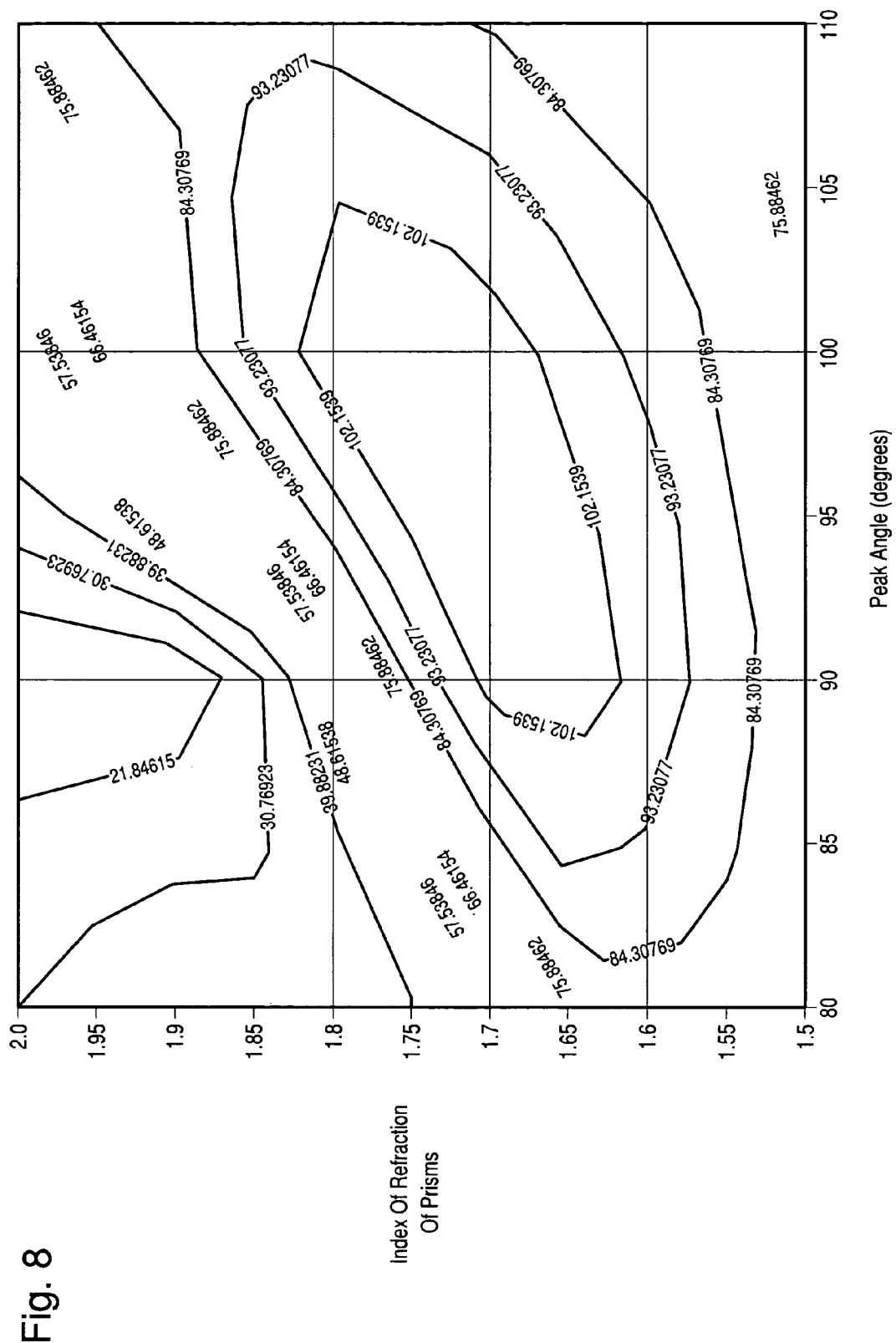
FIG. 8 is a map of the central luminance of crossed optical substrates as a function of the prism peak angle and the refractive index of the substrates.

FIGS. 8 to 10 illustrate that by increasing refractive index of substrate 24 and/or by increasing the peak angle, α, of the prism structures 26, an improvement is realized as an increase in the on-axis luminance of the optical substrate 24 as well as a reduction in the energy sidelobes of the horizontal and vertical luminance profile.

Patent application Ser. No. 10/248,099 filed Dec. 18, 2002, the disclosure of which is incorporated herein by reference in its entirety, discloses a method of preparing a workpiece, forming a positive or negative electroform over the surface of the workpiece, forming a replica of the electroform and transferring the replica of the electroform to the surface of an optical substrate. The following illustrates the method of application Ser. No. 10/248,099 applied in preparing a modeled surface of the faceted optical substrate 24 according to an embodiment of the invention.

Figure 11:
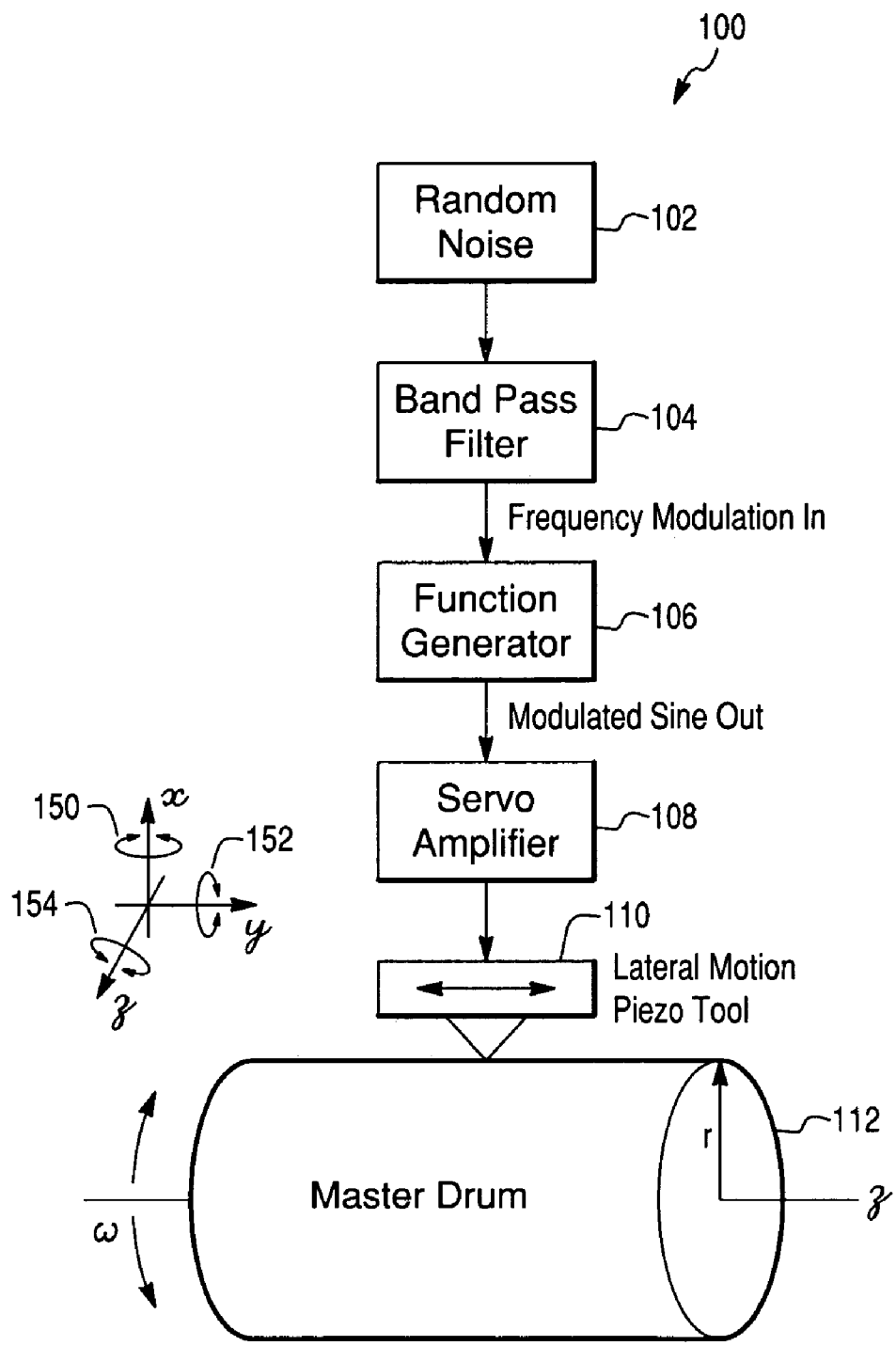
FIG. 11 is a flow chart showing a method of machining a surface of a workpiece wherein the workpiece is a master drum.

FIG. 11 illustrates the application Ser. No. 10/248,099 method of machining a surface of a workpiece shown generally at 100. The workpiece is a master to model faceted optical substrate 24 by introducing a nonrandomized, randomized or pseudo randomized modulation to the surface 22 according to the invention. In FIG. 11, a noise signal 102 is band pass filtered 104 and provided as input to a function generator 106. A modulated mathematical function, such as a sinusoidal wave form is provided by the function generator 106 as input to a servo mechanism 108. The noise signal 102, the bandpass filter 104 and the function generator 106 can be replaced by a computer system equipped with the appropriate signal processing software and digital-to-analog conversion board so as to generate the input signal to the servo mechanism 108.

Figure 13:
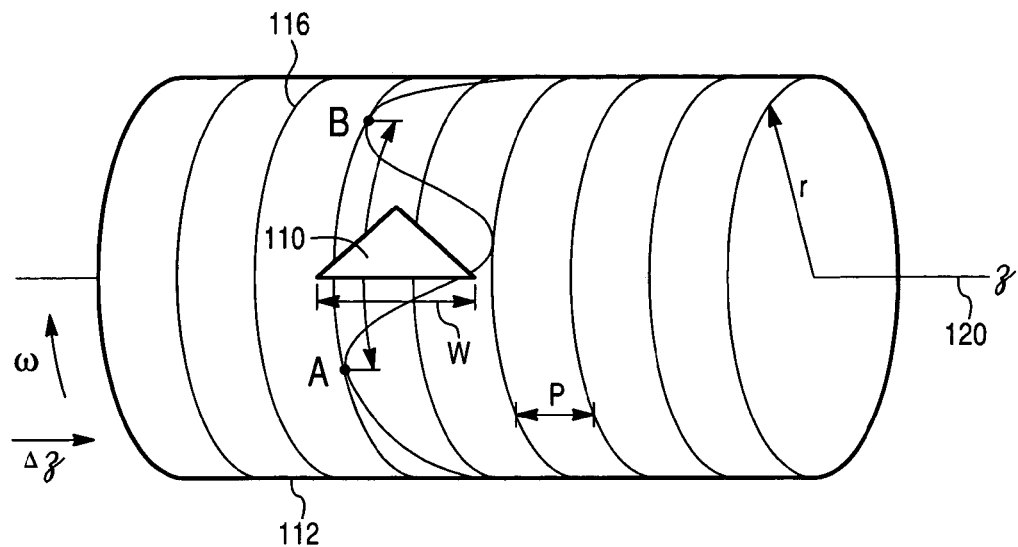
FIG. 13 is a diagram of a master drum having a random or pseudo random pattern therein following a generally spiral-like or threaded path.

The servo mechanism 108 directs relative movement between a cutting tool 110 and the surface of a drum 112 rotating at an angular velocity of ω in a cylindrical coordinate system (r,θ,z). As the drum 112 rotates at angular velocity ω, the cutting tool 110 moves relative to the drum 112 along the drum axis, z, and is driven to move back and forth in a random fashion with a frequency of up to about 10,000 Hz parallel to the z-axis of drum 112 (along the y-axis of the tool). Cutting tool 110 is in continuous contact with the surface of rotating drum 110 to cut or machine a randomized spiral-like or threaded pattern 116 (FIG. 13) of pitch, P. A two axis cutting tool 110 may move back and forth parallel to the drum axis 112 and also perpendicular to the drum surface.

Figure 12:
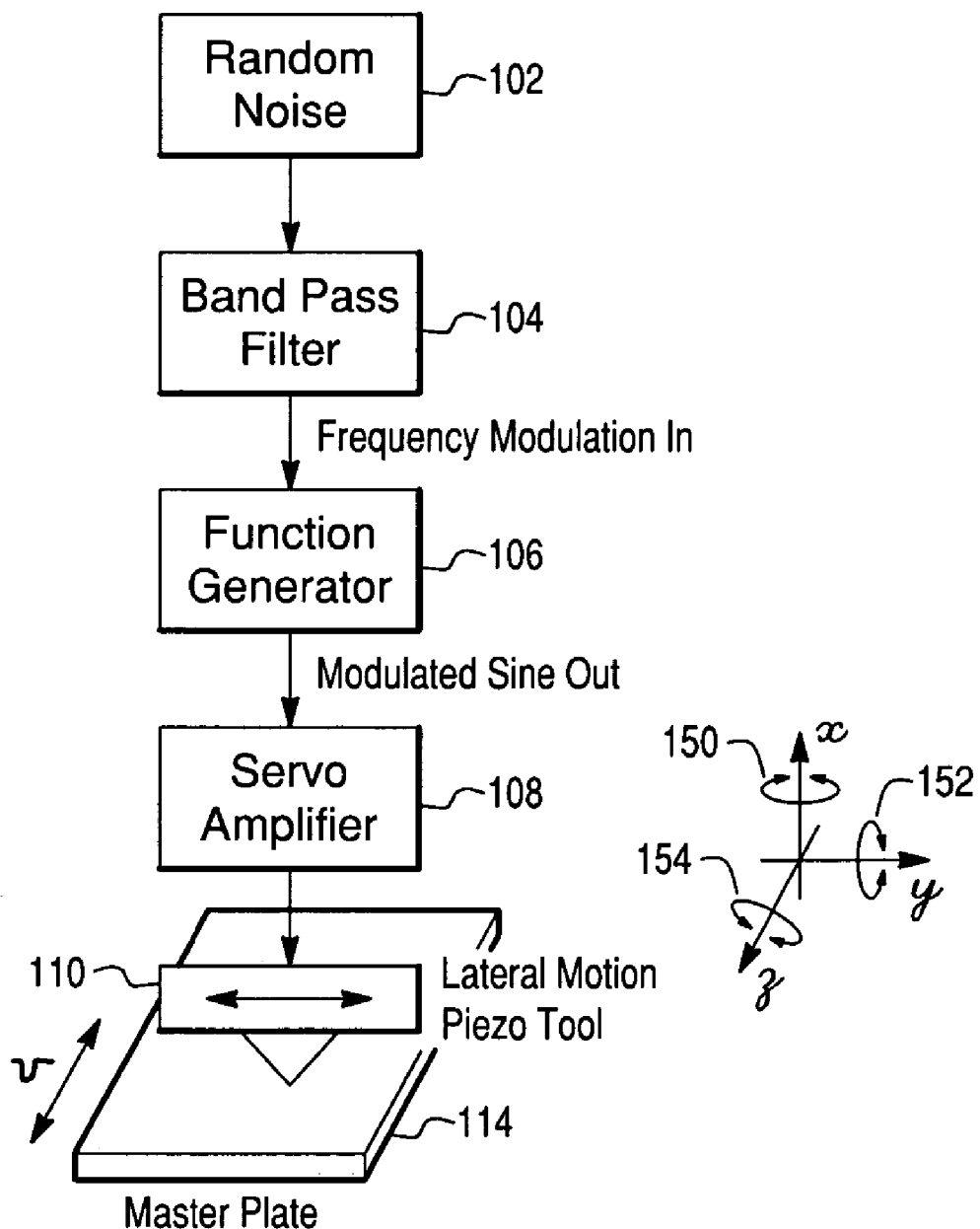
FIG. 12 is a flow chart showing a method of machining a surface of a workpiece wherein the workpiece is on a master plate.
Figure 15:
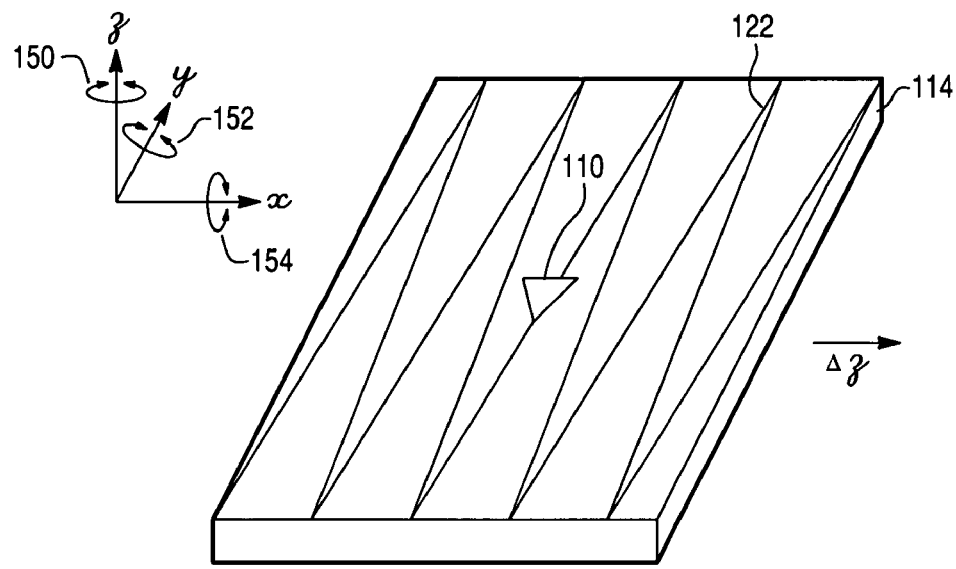
FIG. 15 is a diagram of a master plate having a random or pseudo random pattern therein following a generally sawtooth or triangular path.
Figure 16:
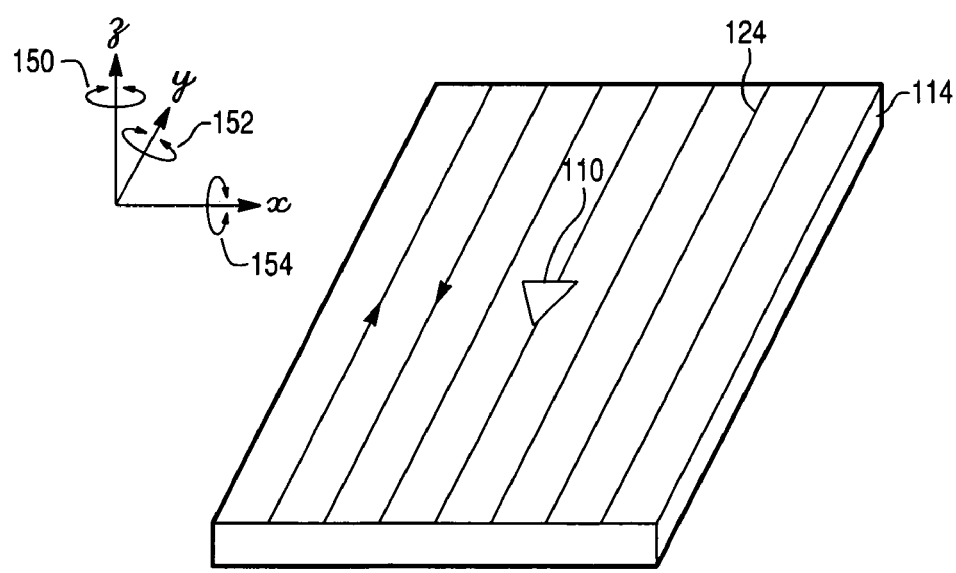
FIG. 16 is a diagram of a master plate having a random or pseudo random pattern therein along a series of paths.
Figure 17:
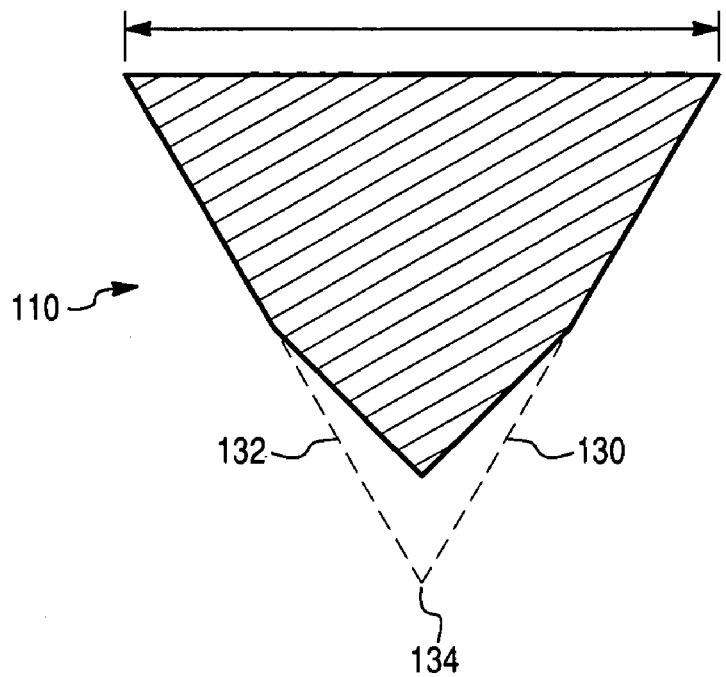
FIG. 17 is a diagram of a cross section of a cutting tool in the nature of a prismatic structure.
Figure 18:
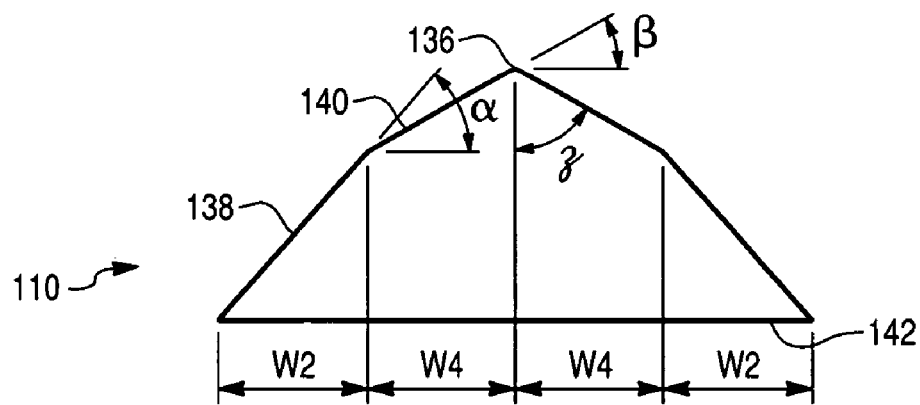
FIG. 18 is a diagram of the prismatic cutting tool of FIG. 6A having compound angled facets.

Alternatively, the cutting tool 110 may be in contact with the surface of a flat plate 114 as seen in FIG. 12, moving at a velocity of v in a rectilinear coordinate system (x,y,z). As plate 114 moves at velocity v, the cutting tool 110 randomly moves back and forth across the plate to cut or machine a randomized triangular pattern 122 (FIG. 15) into the surface of the plate 114.

Figure 14:
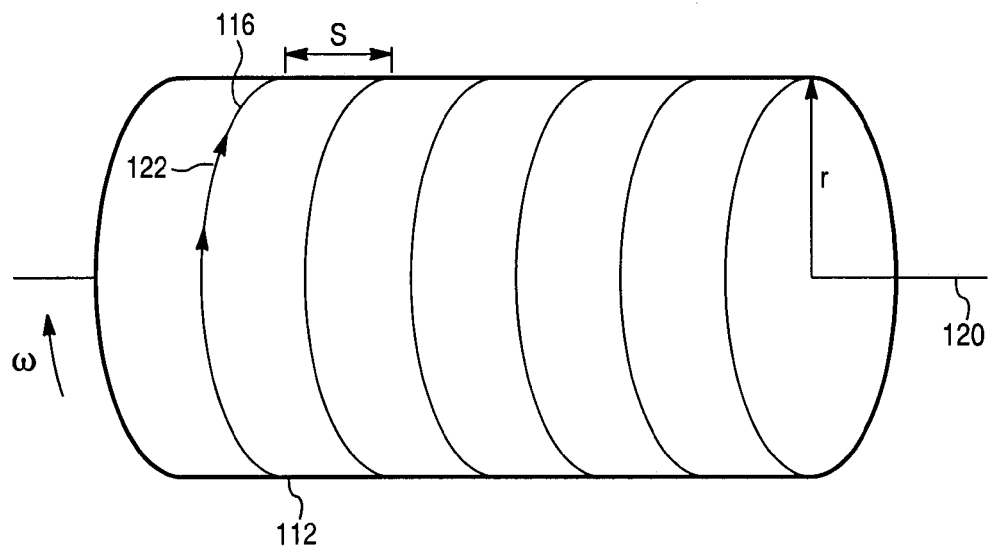
FIG. 14 is a diagram of a master drum having a random or pseudo random pattern therein over generally concentric rings.

In an alternative embodiment of the invention, as seen in FIG. 14, the drum 112 need not move along the z axis as the drum 112 rotates. As such, the cutting tool machines a randomized or pseudo randomized pattern along a series of concentric rings 118 in the surface of the drum 112 whereby the cutting tool returns to a starting point 122 for each cutting pass. To achieve good cutting quality, a control system can allow the cutting tool 110 to repeat the pattern of any $i^{th}$ cutting pass for the number of revolutions depending upon the desired final cut depth and in-feed rate. When the cutting tool 110 finishes the number of revolutions and returns to the starting point 122 prior to the $i^{th}$ cutting pass, the cutting tool 110 is shifted or stepped to a position $S_i$ for the $i^{th}$ cutting pass.

Figure 24:
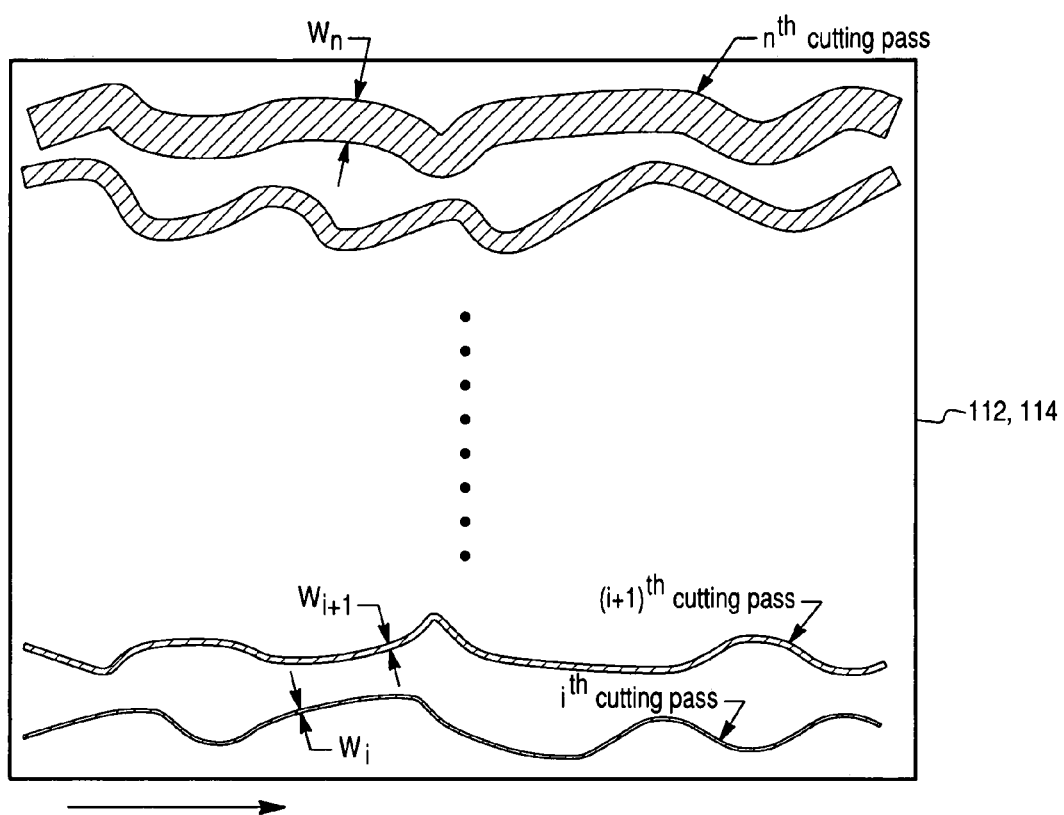
FIG. 24 is a depiction of a cutting gradient introduced into the surface of the machined surface of the workpiece.

The cutting tool 110 may have more than one axis of travel. For example it can have three axes of travel r, θ, z in cylindrical coordinates and x, y, z in rectilinear coordinates. Such additional axes allow for the cutting of toroidal lens type structures when using a radius cutting tool 110 or allow for a gradient in the cut along the cut length, for example. Translational axes r, θ, z and x, y, z will also allow for introducing a cutting gradient into the pattern machined into the surface of the workpiece 112, 114 for subsequent cutting passes. Such a cutting gradient is best seen with reference to FIG. 24. In FIG. 24, the $i^{th}$ cutting pass has a thickness or width of $w_i$ and the $(i+1)^{th}$ cutting pass has a thickness of $w_{i+1}$ where $w_i$ is greater or less than $w_{i+1}$. Furthermore, the $n^{th}$ cutting pass has a width of $w_n$ where $w_n$ is greater or less than $w_{i+1}$. It will be understood that the change in the thickness in the cutting pattern in subsequent cutting passes may be nonrandom, random or pseudo random. Additional rotational degrees of freedom (e.g., pitch 152, yaw 150 and roll 154, FIGS. 11, 12, 15 and 16) may be used to change the angular orientation of the cutting tool 110 with respect to the surface of the workpiece 112, 114, thus changing the geometry of the facets machined into the master surface.

Modulation Diffusion

The at least one prism structure provides defocusing diffusion to light incident upon the substrate 24 due to the bowed shaped of the at least one prism structure. Additionally, the at least one prism structure provides modulation diffusion because the surface of the at least one prism structure is defined by modulating a first surface structure function by a second surface structure function.

The second surface structure function $f_2(x,y)$ modulates the first surface structure function $f_1(x,y)$ so as to produce an overall surface function $f(x,y)$ that defines the surface of the optical substrate 24. As for the first surface structure function $f_1(x,y)$, the second surface structure function $f_2(x,y)$ need not be expressed in rectilinear coordinates, and may be expressed in another coordinate system, such as in a polar coordinate system, for example. The second surface structure function may be a pseudo-random or random function of height, phase, or frequency, of the prism structures, for example. Moreover, the combination of the first and second surface structure functions can be accomplished by way of modulating the first function by the second function so that the resulting function $f(x,y)$ has a pseudo-randomly varying height, phase or frequency along a direction of the optical substrate 24. Examples of specific surface structure functions are provided, for example, in U.S. application Ser. No. 10/150,958 to Olczak.

As one example of a second surface structure function, the prism structure height can be randomly or pseudo-randomly modulated between certain limits at random or fixed intervals along the direction perpendicular to the long axes of the prism structures or along the direction parallel to the axes, of the optical substrate 24. As best understood, the term random means true randomness or randomness to the extent possible when generated by human means, e.g., pseudo-randomness. In another example, the phase, which corresponds to the position of the prism peaks along the direction perpendicular to long axes, can be modulated, at least pseudo-randomly between certain limits. Furthermore, a combination of modulation techniques can be used to define the surface of the optical substrate 24 so that the first surface redirects light in a defocusing manner due to the prism structures with curved sides while at the same time providing additional diffusing light.

Even after the first surface structure function is modulated to produce the surface of the optical substrate 24, the characteristics of the first surface structure function that produce light redirection are largely retained in the resulting surface. The amount of additional diffusion is tunable by altering the modulation applied to the first surface structure function by the second surface structure function. For instance, an increase in the amount of modulation applied to the first surface structure function increases additional diffusion.

The amount of modulation not only adds additional diffusion, but can be used to tune the cosmetic look of the film. The amount of diffusion provided by the modulation also depends on the spatial wavelength components of the second surface structure function. Generally, as the wavelength of the modulation is decreased the texture becomes finer and diffusion increases.

Beneficially, Moiré effects due to any periodic nature of the first surface function may be reduced due to the pseudo random or random nature of the second surface function. Moiré effects may result from interferences caused by regularity in different layers of an optical structure. The optical substrate 24 when incorporated in an optical structure can also provide diffuse light which will tend to reduce the interference Moiré effects in other structures of the optical structure (other than the film itself).

The autocorrelation function, R(x,y), is a measure of the randomness of a surface that is used in surface metrology. Over a certain correlation length, $l_c$, however, the value of an autocorrelation function, R(x,y), drops to a fraction of its initial value. An autocorrelation value of 1.0, for instance, would be considered a highly or perfectly correlated surface. For example, the first surface structure function $f_1(x,y)$, if defining a repeating prism structure, would have an autocorrelation value of 1.0. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length. A more detailed discussion of the autocorrelation function is provided in David J. Whitehouse, Handbook of Surface Metrology, IOP Publishing Ltd. (1994), p. 49-58.

Figure 22:
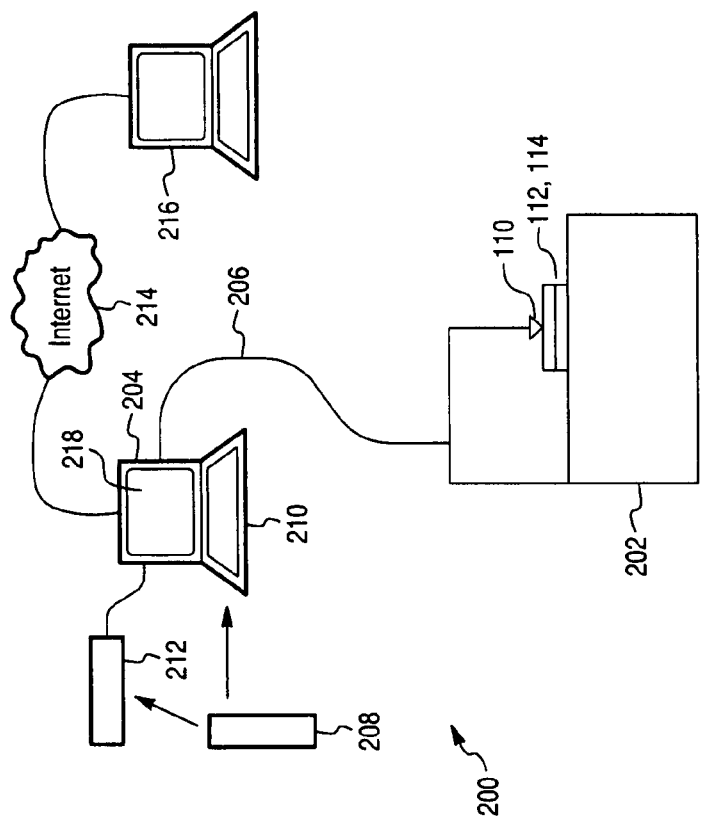
FIG. 22 is a schematic representation of a system and apparatus for machining the surface of a work piece in communication over a communications or data network with remote locations.

Exemplary equipment needed to machine the surface of the workpiece 112, 114 in the invention is shown in FIG. 22. Machining the surface of the workpiece 112, 114 can be accomplished by computer numerically controlled (CNC) milling or cutting machine 202. The machine 202 includes cutting tool 110, which is controlled by a software program 208 installed in a computer 204. The software program 208 controls the movement of the cutting tool 110. The computer 204 is interconnected to the CNC milling machine 202 by an appropriate cabling system 206. The computer 204 includes storage medium 212 for storing software program 208, a processor for executing the program 208, keyboard 210 for providing manual input to the processor, a display 218, and a modem or network card for communicating with a remote computer 216 via the Internet 214 or a local network.

FIG. 23 illustrates a master machining system 400 with a fast tool servo for cutting workpiece grooves with lateral variations. An input/output data processor 402 provides cutting commands to a digital signal processing (DSP) unit 404 that supplies a signal to a digital-to-analog (DA) conversion device 406. Voltage amplifier 408 receives a signal from the DA converter 406 and drives fast tool servo mechanism 410 to direct the motion of cutting tool 110. Cutting tool position probe 412 senses a position of the cutting tool 110 and provides a signal indicative of the position to a sensor amplifier 418. Amplifier 418 amplifies the signal. The amplified signal is directed to analog-to-digital (A/D) converter 420. Lathe encoder 414 determines the position of the workpiece (e.g., drum 112) and provides a feedback signal to the A/D converter 420. The A/D converter thus provides a feedback signal indicative of the position of the cutting tool 110 and the position of the workpiece 112, 114 as output to the digital signal processing unit 404. The DSP unit 404 provides a processed signal to the input/output processor 402.

The system 400 can provide a randomly or pseudo randomly machined workpiece surface. In operation, computer 204 with installed software program 208 is in communication with the CNC milling machine 202. Controlling mathematical function or functions may be stored within the computer's memory or may be stored on a remote computer 216 and accessed via the Internet 214 or via a local network.

The cutting element 110 of the CNC machine 202 begins to mill the workpiece 112, 114 according to commands provided by the software program 208 that provides coordinates to direct movement of the cutting tool 110. Additionally, the program 208 controls depth of the milling process. The process provides a nonrandomized, randomized or pseudo randomized workpiece that can be used as a "positive" or a "negative" master to produce an optical substrate. For example, the optical substrate 24 of FIG. 1 can be generated by forming a negative or positive electroform over the surface of the workpiece 112, 114. Alternatively, a molding material can be used to form a replica of an original positive or negative master, for example, an ultraviolet (UV) or thermal curing epoxy material or silicon material. Any of these replicas may be used as a mold for a plastic part. Embossing, injection molding, or other methods may be used to form the parts.

Autocorrelation function, R(x,y), is a measure of the randomness of a surface in electro metrology. Over a certain correlation length, $l_c$, however, the value of an autocorrelation function, R(x,y), drops to a fraction of its initial value. An autocorrelation value of 1.0, for instance, would be considered a highly or perfectly correlated surface. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length.

In some embodiments of the invention, the autocorrelation function value for the three-dimensional surface of the optical substrate 24 drops to less than or equal to 1/e of its initial value in a correlation length of about 1 cm or less. In still other embodiments, the value of the autocorrelation function drops to 1/e of its initial value in about 0.5 cm or less. For other embodiments of the substrate the value of the autocorrelation function along length w drops to less than or equal to 1/e of its initial value in about 200 microns or less. For still other embodiments, the value of the autocorrelation function along width w drops to less than or equal to 1/e of its initial value in about 11 microns or less.

Aside from the use of the optical substrates 24 described above in backlight displays for brightness enhancement, the substrates can be used in a wide variety of other applications as well. Embodiments of the substrates 24 can be used in Fresnel lenses, hybrid glass/plastic lenses, optical disks, diffuser films, holographic substrates or in combination with conventional lenses, prisms or mirrors. Such embodiments could be formed by modulating concentric circles or ellipses having fixed characteristics. The optical substrates can also be used in single or multi-order reflective, transmissive or partially transmissive, devices, whether light absorbing or non light absorbing; prisms, holographic optical elements, or diffraction gratings. The substrates can be used in other applications such as projection displays, illuminated signs and traffic signals.

While preferred embodiments of the invention have been described, the present invention is capable of variation and modification and therefore should not be limited to the precise details of the Examples. The invention includes changes and alterations that fall within the purview of the following claims.

What is claimed is:

1. An optical substrate comprising:
   at least one prism structure, each of the at least one prism structures having a first surface characterized by a first surface structure function modulated by a second surface structure function, the first surface structure function having characteristics to provide that each of the at least one prism structures has a cross section with at least two curved sides to provide defocusing diffusion to light incident on the substrate, both the first surface structure function and the second surface structure function encompassing the two curved sides, the second surface structure function having characteristics to provide additional diffusion to the light incident on the substrate, wherein each of the at least two curved sides is defined by an equation $$z = \frac{cr^2}{1+\sqrt{1-(1+k)c^2r^2}} + \sum_{i=1}^{N} a_i r^i$$

where $a_i$ are coefficients and N is a positive integer greater than 1, z is a perpendicular deviation of a surface of the curved side from a straight line originating at a first reference point and terminating at a second reference point, and where r is the distance along the straight line from the first reference point.

2. The optical substrate of claim 1, wherein the second surface structure function is random or pseudo random.

3. The optical substrate of claim 1, wherein each of the at least two curved sides has a parabolic or circular shape.

4. The optical substrate of claim 1, wherein the second surface structure function provides that the at least one prism has a bowed shape.

5. The optical substrate of claim 1, wherein the at least one prism structure comprises a plurality of prism structures, each of the plurality of prism structures has a prescribed peak angle, α, a height, h, a length, l, and the plurality of prism structures has a pitch, p.

6. The optical substrate of claim 5, wherein a peak angle of each of the at least one prism structures is greater than 90 degrees and the refractive index of the substrate is between approximately 1.65 and 1.8.

7. The optical substrate of claim 5, wherein a peak angle of each of the at least one prism structures is approximately 100 degrees.

8. A method of fabricating the optical substrate of claim 1, comprising:
   bringing a cutting tool into contact with the surface of a workpiece;
   for at least one cutting pass, causing relative movement between the cutting tool and the surface of the workpiece along a path in the surface of the workpiece;
   forming a positive or negative electroform over the surface of the workpiece to provide the optical substrate of claim 1.

9. A method of fabricating the optical substrate of claim 1, comprising:
   bringing a cutting tool into contact with the surface of a workpiece;
   for at least one cutting pass, causing relative movement between the cutting tool and the surface of the workpiece along a path in the surface of the workpiece;
   forming a positive or negative electroform over the surface of the workpiece; and
   forming a replica of the electroform to provide the optical substrate of claim 1.

10. A backlight display device comprising:
    an optical source for generating light;
    a light guide for guiding the light there along including a reflective device positioned along the light guide for reflecting the light out of the light guide; and
    the optical substrate of claim 1, wherein optical substrate is receptive of the light from the reflective device.

11. An optical substrate comprising:
    at least one prism structure, each of the at least one prism structures having a first surface characterized by a first surface structure function modulated by a second surface structure function, the first surface structure function having characteristics to provide that each of the at least one prism structures has a cross section with at least one curved side to provide defocusing diffusion to light incident on the substrate, the second surface structure function having characteristics to provide additional diffusion to the light incident on the substrate,
    wherein the at least one curved side is defined by an equation $$z = \frac{cr^2}{1+\sqrt{1-(1+k)c^2r^2}} + dr^2 + er^4 + fr^6,$$

wherein z is a perpendicular deviation of a surface of the curved side from a straight line originating at a first reference point and terminating at a second reference point and coefficients of the equation lie within the following approximate ranges: $-20<c<20$; $-10<d<10$; $-10<e<10$; $-10<f<10$ and $-1<k$ or less than or equal to zero, and where r is the distance along the straight line from the first reference point.

12. A work piece for producing an optical substrate, the workpiece comprising:
    at least one prism structure, each of the at least one prism structures having a first surface characterized by a first surface structure function modulated by a second surface structure function, the first surface function having characteristics to provide that each of the at least one prism structure has a cross section with at least two curved sides to provide defocusing diffusion to light incident on the substrate, both the first surface structure function and the second surface structure function encompassing the two curved sides, the second surface structure function having characteristics to provide additional diffusion to the light incident on the substrate, wherein each of the at least two curved sides is defined by an equation $$z = \frac{cr^2}{1+\sqrt{1-(1+k)c^2r^2}} + dr^2 + er^4 + fr^6,$$

wherein z is a perpendicular deviation of a surface of the curved side from a straight line originating at a first reference point and terminating at a second reference point and coefficients of the equation lie within the following approximate ranges: $-20<c<20$; $-10<d<10$; $-10<e<10$; $-10<f<10$ and $-1<k$ or less than or equal to zero, and where r is the distance alone the straight line from the first reference point.

* * * * *